United States Patent Office 3,080,404
Patented Mar. 5, 1963

3,080,404
ESTERS OF ALIPHATIC HALOGENATED CARBOX-
YLIC ACIDS AND PROCESS FOR PREPARING
THEM
Helmut Klug and Hellmut Jochinke, Gersthofen, near
Augsburg, Germany, assignors to Farbwerke Hoechst
Aktiengesellschaft vormals Meister Lucius & Brüning,
Frankfurt am Main, Germany, a corporation of Ger-
many
No Drawing. Filed Dec. 18, 1959, Ser. No. 860,334
Claims priority, application Germany Dec. 24, 1958
3 Claims. (Cl. 260—408)

The present invention relates to a process for preparing stable halogen-containing plasticizers by reacting halogen-containing carboxylic acids with compounds of low molecular weight containing epoxide groups.

It is already known to use free aliphatic chlorinated carboxylic acids as plasticizers for polyvinyl chloride and chlorinated rubber. In practice, however, the use of these compounds has proved to be inconvenient for the free carboxyl groups of the compounds produce corrosion of metals and electric conductivity is increased. It is also known to use methyl ester of chlorinated fatty acids as plasticizers for polyvinly chloride. The applicability of the chlorinated esters of fatty acids as well as that of the free chlorinated carboxylic acids as plasticizers is, however, limited to a large extent owing to the comparatively great instability of these compounds.

It is also known to increase the stability by using products of the special type of the polychlorostearic acid methyl ester in admixture with more or less large quantities of epoxide compounds of higher molecular weight which are known as acceptors of hydrochloric acid. The method is, however, uneconomical for it requires considerable quantities, namely 5% by weight and more, of epoxide compounds, the percentage being calculated on the polychlorostearic acid ester. Besides, the aforesaid process is limited to the use of epoxidized fatty oils.

Now we have found that esterification products that are much more stable than the known materials can be obtained from aliphatic mono- or dicarboxylic acids containing at least 4, preferably 8 to 22 carbon atoms, containing one or more halogen atoms, preferably chlorine, as substituents, which acids contain, if desired, olefinic bonds, by reacting said halogenated carboxylic acids with compounds of low molecular weight containing epoxide groups, especially ethylene oxide, until a complete or preferably a partial conversion has taken place, and by esterifying the residual acid portions, if any such portions are still present, with a mono- or polyhydric alcohol, the alcoholic group of which is bound to a primary or secondary aliphatic carbon atom. The esterification may also be brought about before the action of the epoxides sets in or the two operations may take place simultaneously. The conversion of the halogenated carboxylic acids with the compounds containing epoxide groups is preferably brought about to an extent of not more than 10 to 50%. The resulting reaction products are semi-esters of the aforesaid aliphatic carboxylic acids with glycols whose hydroxyl groups are bound to adjacent carbon atoms or mixtures of these compounds with esters of the above-mentioned fatty acids with mono- to trihydric alcohols, the hydroxyl groups of which are bound to primary or secondary aliphatic carbon atoms. The fact that stable compounds form when compounds containing epoxide groups of low molecular weight, for example, ethylene oxide, act upon halogenated carboxylic acids is suprising since the ethylene oxide, as was to be foreseen, acts on the carboxyl groups and not on the chlorine atoms of the aliphatic hydrocarbon radical and it was to be expected that the properties of the reaction products were similar to those of normal esters. The glycol semi-ester obtained from a chlorostearic acid containing 40% of chlorine and ethylene oxide, for example, has the following values which have been ascertained by analysis: Content of chlorine 35.9% (according to the theory: 36.5%), acid value 0, saponification value 115.5 (according to theory: 109).

When the stability of an esterification product obtained in this way is compared to the stability of a product prepared in the usual way, that is to say by direct esterification, with any desired alcohol, extraordinarily great differences can immediately be observed, which are demonstrated in the following table:

| Stability | Methyl ester obtained by direct esterification from a chlorostearic acid containing 40% by weight of chlorine, percent by weight | Glycol semi-ester obtained from a chlorosteraic acid containing 40% by weight of chlorine and ethylene oxide, percent by weight |
|---|---|---|
| Splitting off of hydrogen chloride after heating for 4 hours at 175° C | about 1.4 | 0.02 |

The compounds prepared by the process of the present invention can even be stabilized to a large extent—and this is surprising—by reacting but a relatively small portion of the chlorinated fatty acids with ethylene oxide or a compound containing epoxide groups. A quantity of ethylene oxide equivalent to about 1/10 or even only 1/20 of the quantity of the carboxyl groups present is, for example, already completely sufficient.

In the process of the invention saturated or olefinically unsaturated aliphatic mono- or dicarboxylic acids containing one or more halogen atoms, preferably chlorine, are first reacted with low molecular epoxide compounds until a complete or preferably only a partial reaction has taken place. The reaction can, if desired, be carried out in the presence of a catalyst, for example hydrogen chloride, sulfuric acid or phosphoric acid. The portions of epoxide dissolved in the product are then blown out with inert gases or eliminated by distillation, the neutralization number is, if desired, ascertained and subsequently the whole is esterified with the amount of alcohol that has been calculated or with more than that amount, if desired after the addition of a known esterification catalyst, for example the above-mentioned acids or cation exchangers, the esterification being carried out by a usual method, for example by the addition of a substance binding water (calcium chloride, sodium sulfate etc.) or by distilling off azeotropically the reaction water that has formed with so-called entraining agents.

As starting material there may be used a great number of aliphatic mono- or polyfunctional halogenated, preferably chlorinated, in certain cases also brominated or chlorobrominated, carboxylic acids. The molecular weight and the content of halogen or, more especially, chlorine of the aforesaid compounds may vary within wide limits. Besides, the aforesaid compounds may be modified by further substituents. Suitable compounds are, for example, the mono-, di-, tri- or polychlorination products of n-butyric acid, 2-ethyl-caproic acid, lauric acid, palmitic acid, stearic acid and behenic acid or undecylenic acid or of oleic acid or the mono-, di-, tri- or polychlorination products of mixtures of the aforesaid acids, for example, commercial stearic acid which still contains palmitic acid, or mixtures as can be obtained by ester splitting from tallow and other natural fats such as coconut oil. In the same manner there may be used as starting material for the reaction according to the invention the halogenation products, and preferably the chlorination products, of derivatives of the aforesaid carboxylic acids which contain further heteroatoms or hetero groups as substituents, for example nitrostearic acid, ω-amino-undecanic acid or ricinoleic acid. As dicarboxylic acids there may, for example, be mentioned tetrachloro-succinic acid, α,α'-dichloro-adipic acid and pentachloro- or polychloro-sebacic acid.

As compounds containing epoxide groups there may be used, for example, besides ethylene oxide which is particularly suitable, propylene oxide, 1.2-butylene oxide, cyclohexene oxide, phenoxy propene oxide, epichlorohydrine and glycidic acid ethyl ester.

As alcohols of the mono-, di- or polyfunctional series that are suitable for use in carrying out the esterification there may be mentioned by way of example methanol, ethanol, isopropanol, n-butanol, iso-amyl alcohol, 2-ethyl-hexanol, dodecanol-(1), octadecanol-(1), oleyl alcohol, benzyl alcohol, glycol, glycol mono-ethyl ether, diglycol mono-ethyl ether, glycerin, glycerin mono-ethyl ether, octadecanediol-(1.12) and mixtures of these compounds. It is often preferred to use monohydric alcohols containing up to 5 carbon atoms and/or partially etherified di- to trihydric alcohols that contain at least one free hydroxyl group.

It is to be understood that many variations of the process of the invention are possible. In many cases it is advisable to carry out the process under elevated pressure whereby the reaction is in general accelerated. It is also possible to conduct the reaction in a partially or completely continuous manner or to carry it out in the presence of solvents or diluents, for example, paraffin hydrocarbons or chlorinated hydrocarbons.

The compounds obtained by the process of the invention are above all suitable plasticizers for polyvinyl chloride, copolymers of vinyl chloride, for example copolymers of vinyl chloride and vinyl acetate and of vinyl chloride and vinylidene chloride, nitro-cellulose and the like. Besides, they may be added to natural or synthetic rubber, chlorinated rubber and polyester resins. They are either used in pure form or in admixture with the usual plasticizers.

The compounds prepared by the process of the invention may not only be used as plasticizers but also as additives for lubricating oils, soluble oils and cutting oils. They are also suitable, especially when used in admixture with inorganic additives such as antimony trioxide, for imparting flame-resistance to combustible materials, for example paper, textiles, wood, wood fiber materials, artificial materials and paints.

The following examples serve to illustrate the invention but they are not intended to limit it thereto.

Example 1

500 grams of stearic acid which had been chlorinated, for example by the action of gaseous chlorine to a content of 40% of chlorine and which had an average molecular weight of 465 were reacted under a superatmospheric pressure of 0.15 atmosphere (gage) with gaseous ethylene oxide in a closed apparatus at a temperature within the range of 85 to 90° C. while 0.4% by weight of concentrated sulfuric acid was added. After 12 hours the mixture had a neutralization number of 41.5. The portions of ethylene oxide that had not yet undergone conversion were blown out with nitrogen, absolute methyl alcohol was added in an excess in a quantity of 160 grams (corresponding to 5 mols) as esterification agent and the reaction was allowed to continue for 24 hours at 70° C. in the presence of 65 grams of anhydrous calcium chloride.

The excess of methyl alcohol contained in the end product was then eliminated by distillation. The calcium chloride which also contaminated the end product was eliminated by washing the product several times with water, preferably after a temporary dilution with ether or at an elevated temperature, for example, in a heated separating funnel. It proved to be advantageous to treat the product or its ethereal solution with a decolorizing agent such as active carbon or bleaching earth whereupon a purified, light yellow material having the following characteristic values was obtained: density at 20° C. 1.19, content of chlorine 35%, neutralization number 1.6, stability: 0.01% of hydrogen chloride split off after a 4 hours' heating at 175° C. The yield was almost quantitative.

Example 2

920 grams (about 2 mols) of stearic acid that had been chlorinated to a chlorine content of 39.5% by weight were reacted with gaseous ethylene oxide for 12 hours in the manner described in Example 1 while 0.2% by weight of anhydrous sulfuric acid was added. The product had a neutralization number of 48.0.

Subsequently the whole was esterified with n-butanol by eliminating the water that had formed during the reaction, at a temperature within the range of about 75 to 80° C. and while maintaining a diminished pressure of 210 mm. of mercury. After another 10 hours a very light-colored end product was obtained from which the excess of n-butanol was separated by distillation. The ester had the following characteristic values: density at 20° C. 1.176; content of chlorine 34.7%; neutralization number 1.6; stability (measured under the conditions indicated in Example 1) about 0.12% of hydrogen chloride split off.

Example 3

400 grams of polychloro-sebacic acid obtained by the action of gaseous chlorine on sebacic acid and containing 40.7% of chlorine were partially reacted with ethylene oxide in the manner described in Example 1. The material that had thus been obtained had a neutralization number of 191.

In order to bring about further esterification of the acid components still present 111 grams, that is to say about 1.5 mols, of n-butanol were added and the water that formed in the further course of the reaction was distilled off azeotropically with a mixture of 200 grams of benzene and 200 grams of toluene. The end product which after 72 hours had been freed by distillation from the portions of n-butanol or benzene and toluene still present had a density of 1.286, a chlorine content of 29.3% and a saponification value of 240.8 It was practically free from acid. About 0.2% of hydrogen chloride was split off under the conditions that have already been mentioned.

Example 4

By the action of gaseous chlorine on commercial palm-kernel fatty acid a chlorination product was obtained which after absorption of 39.4% by weight of chlorine had an acid value of 142.8. The resulting chlorinated fatty acid was treated with gaseous ethylene oxide under a slightly superatmospheric pressure until a sample of the reaction product that had been blown out well with nitrogen had an acid value of about 120.

To 233 grams (corresponding to about ¼ mol of acid that had not yet undergone conversion) of this product 160 grams (=5 mols) of methanol and 55.5 grams (=0.5 mol) of anhydrous pulverized calcium chloride were added and the whole was heated under reflux, while stirring, for 24 hours until the esterification was complete. The calcium chloride was separated in the form of an aqueous solution of about 20% strength by the addition of 220 grams of water. The ester was filtered twice with bleaching earth and thereby purified.

Yield: 223 grams (corresponding to 93.3% of the theoretical yield) of methyl ester having a viscosity of 925 centipoises at 20° C., 0.31% of hydrogen chloride was split off under the conditions mentioned above.

Example 5

A commercial tallow fatty acid which had an acid value of 110.7 and which had been chlorinated to a content of 39.4% of chlorine was partially converted into the glycol semi-ester by a treatment with gaseous ethylene oxide. The product thus obtained had an acid value of 94.5.

To 356 grams (=0.6 mol), calculated on the acid components present, of the chlorinated partial ester 44.4 grams (=0.6 mol) of n-butanol was added and after the addition of 200 grams of benzene and 0.5 cc. of concentrated sulfuric acid the whole was esterified by distilling off the benzene and the water as an azeotropic mixture.

After the benzene still adhering to the esterification product had been distilled off the following characteristic values were ascertained: Content of chlorine 35.2%; degree of viscosity: 2700 centipoises at 20° C.; 0.2% of hydrogen chloride was split off under the conditions that have already been mentioned.

Example 6

500 grams of a cottonseed oil fatty acid which had been chlorinated to a content of 39.8% of chlorine were esterified with 111 grams of n-butanol in the manner described in Example 5 which was only modified in that instead of benzene toluene was used as entraining agent.

Within 10 hours a light yellow esterification product was obtained which had the following characteristic values: content of chlorine 34.2%; acid value 2.6; saponification value 110.5.

At 20° C. the product had a viscosity of 6400 centipoises. 0.06% of hydrogen chloride was split off under the conditions mentioned above.

Example 7

15 grams (corresponding to about 0.15 mol) of cyclohexene oxide and 0.3 cc. of concentrated sulfuric acid serving as catalyst were admixed with 406 grams (corresponding to about 0.85 mol) of a stearic acid that had been chlorinated to a chlorine content of 40.0%. The mixture was reacted for 3 hours, while stirring. After that time the acid value was 101.5.

350 grams of the resulting light yellow reaction product which had an acid value of 101.5 were esterified with 74 grams of n-butanol in the presence of 300 grams of benzene in the manner described in Example 5. The end product which was obtained in a crude yield of 376 grams was filtered twice with a mixture of bleaching earth and active carbon and thereby made considerably lighter in color so that it was perfectly suitable as plasticizer. Its viscosity at 20° C. amounted to about 2000 centipoises and 0.15% by weight of hydrogen chloride was split off under the conditions mentioned above.

Example 8

The esterification product described in Example 2, viz. stearic acid which had been treated with ethylene oxide and subsequently esterified with butanol, was in any desired ratio miscible with, and was compatible with, the plasticizers that are usually applied in the industry, for example esters of phthalic, adipic, sebacic and phosphoric acid, and with mineral oils and chlorinated hydrocarbons of higher molecular weight. It was capable of plasticizing polyvinyl chloride, polyvinyl acetate, chlorinated rubber, nitrocellulose and various resins. It could, for example, be used in the following way for plasticizing polyvinyl chloride:

A mixture of 70 parts by weight of polyvinyl chloride that had been prepared by emulsion polymerization and 30 parts by weight of the aforesaid esterification product of Example 2 were treated for 15 minutes at 160° C. in the usual manner on two rolls and subsequently drawn into a foil about 0.5 millimeter thick. The foil was still flexible at temperatures of down to −30° C. and accordingly complied with the demands made on foils with respect to their resistance to cold. The strength of the foil, too, complied with the demands made on polyvinyl chloride containing a plasticizer. The following table comprises the value of the tensile strength of the foil that had been prepared in the manner described in this example and, for reasons of comparison, the value of the tensile strength of a foil prepared in the same manner from 70 parts by weight of polyvinyl chloride and 30 parts by weight of dioctyl phthalate.

| Composition of the foil: | Tensile strength |
|---|---|
| 70 parts by weight of polyvinyl chloride +30 parts by weight of the esterification product of Example 2 _____ kg./cm.² | 270 |
| 70 parts by weight of polyvinyl chloride +30 parts by weight of dioctyl phthalate _____ kg./cm.² | 210 |

We claim:

1. A process for the manufacture of stable halogen-containing plasticizers which comprises reacting an aliphatic halogenated carboxylic acid containing at most one olefinic bond containing at least 4 carbon atoms, and from 1 to 2 carboxylic groups, with a low molecular epoxide to yield semi-glycol esters, the aforesaid halogen component being selected from the group consisting of chlorine and bromine.

2. A process as claimed in claim 1, wherein portions of non-esterified carboxylic groups are esterified in a second stage by additional mono- to trihydric aliphatic alcohols.

3. The process of claim 2, wherein the carboxyl groups are at first in part esterified by the said mono- to trihydric alcohols and then in a second stage by the reaction with the said low molecular epoxide compounds to yield semi-esters of glycols.

References Cited in the file of this patent
UNITED STATES PATENTS

| | | |
|---|---|---|
| 2,255,230 | Ross et al. | Sept. 9, 1941 |
| 2,449,547 | Byrkit | Sept. 21, 1948 |
| 2,476,976 | Grunfeld et al. | July 26, 1949 |
| 2,495,714 | Geiges | Jan. 31, 1950 |
| 2,655,521 | Ladd et al. | Oct. 13, 1953 |